(12) United States Patent
Cucciniello

(10) Patent No.: US 10,197,073 B2
(45) Date of Patent: Feb. 5, 2019

(54) AXIAL VALVE FOR CONTROLLING THE DIFFERENTIAL PRESSURE BETWEEN A DELIVERY BRANCH AND A RETURN BRANCH OF A HYDRAULIC CIRCUIT

(71) Applicant: Watts Industries Italia S.r.l., Trento (IT)

(72) Inventor: Alfredo Marco Cucciniello, Trento (IT)

(73) Assignee: Watts Industries Italia S.R.L., Trento (IT)

( * ) Notice: Subject to any disclaimer, the term of this patent is extended or adjusted under 35 U.S.C. 154(b) by 0 days.

(21) Appl. No.: 15/456,165

(22) Filed: Mar. 10, 2017

(65) Prior Publication Data

US 2017/0261010 A1   Sep. 14, 2017

(30) Foreign Application Priority Data

Mar. 14, 2016 (IT) ............................. 1020160026592

(51) Int. Cl.
*F15B 13/04* (2006.01)
*F15B 13/042* (2006.01)

(52) U.S. Cl.
CPC ...... *F15B 13/0417* (2013.01); *F15B 13/0426* (2013.01); *F15B 2211/88* (2013.01); *Y10T 137/353* (2015.04)

(58) Field of Classification Search
CPC ............. F15B 13/0417; F15B 13/0426; Y10T 137/353
See application file for complete search history.

(56) References Cited

U.S. PATENT DOCUMENTS

| | | | |
|---|---|---|---|
| 3,095,891 A * | 7/1963 | Clements | F15C 4/00 137/85 |
| 4,393,994 A * | 7/1983 | Rieck | F02M 51/0671 239/585.2 |
| 5,396,918 A | 3/1995 | Parker | |

(Continued)

FOREIGN PATENT DOCUMENTS

WO        WO 9619690        6/1996

OTHER PUBLICATIONS

Search Report and Written Opinion, IT UA20161642, 7 pages.

*Primary Examiner* — Craig Schneider
*Assistant Examiner* — Kevin Barss
(74) *Attorney, Agent, or Firm* — Burns & Levinson, LLP; George N. Chaclas

(57) ABSTRACT

An axial differential pressure control valve (DPCV) having an annular body, a tubular body, a coaxial closing member for closing an outlet aperture for exit of the fluid from the tubular body, sealing separation means arranged between first and second chambers containing the return fluid and the delivery fluid, respectively, said separation means being movable axially upon activation of a thrust due to a pressure differential $\Delta P=P1-P2$ and to the spring, wherein the closing member is fixed, and further comprising pins axially arranged between the ring nut and the abutment flange of the spring, wherein the pins pass through the pipefitting so as to come into contact with the said abutment flange and are designed to be displaced axially upon operation of the ring nut independently of the fixed closing member, so as to vary the compression of the spring.

11 Claims, 4 Drawing Sheets

(56) References Cited

Figure 1:
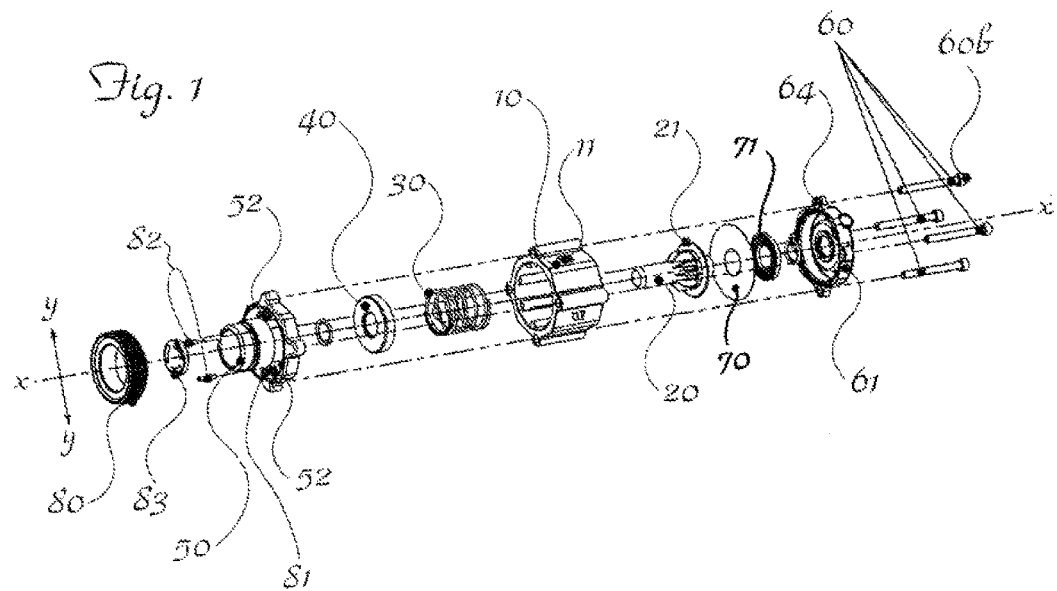

U.S. PATENT DOCUMENTS 6,318,405 B1 * 11/2001 Brandt ............... G05D 16/0663
                                                    137/484.2
9,092,037 B2 * 7/2015 Hii ....................... G05D 16/106

* cited by examiner

AXIAL VALVE FOR CONTROLLING THE DIFFERENTIAL PRESSURE BETWEEN A DELIVERY BRANCH AND A RETURN BRANCH OF A HYDRAULIC CIRCUIT

RELATED APPLICATION

This application claims priority from Italian Patent Application No. 102016000026592, filed Mar. 14, 2016, the entire contents of which is hereby incorporated by reference herein.

DESCRIPTION

The present invention relates to an axial valve for controlling the differential pressure between a delivery branch and a return branch of a hydraulic circuit, in particular for heating and/or cooling.

It is known in the technical sector relating to the hydraulic distribution of fluids among several users that the differential pressure between the fluid delivery and return is subject to fluctuations due to variations in the head along the hydraulic circuit and that, consequently, there exists the need to keep said pressure differential as constant as possible in the event of said fluctuations.

Also known are so-called DPCVs (Differential Pressure Control Valves) which are usually arranged on the return line of the hydraulic circuit and operation of which is based on the action of an elastic membrane connected to a valve opening/closing member.

The shank of the closing member, which is arranged perpendicularly relative to the surface of the membrane, is integrally connected to the latter so that displacements of the membrane in either direction produce corresponding axial displacements of the closing member which open/close the valve.

The membrane is arranged inside a measurement chamber which is divided into two half-chambers so that the membrane is acted on:

during opening: by a prestressed spring with a predefined force F and the pressure P2 of the return fluid;

during closing: by the pressure P1 of the delivery fluid;

the membrane is therefore pushed so that it closes the closing member when the differential pressure $\Delta P = P1 - P2$ exceeds a set threshold value determined by the prestressing force F of the spring.

In addition to the above it is also known that there exists the need to facilitate the use of said DPCVs by arranging them axially in series at the outlet of the return branch or of a return header by means of simple screw/female thread connection.

An example of these axial valves is described in WO96/19690 DANFOSS in which adjustment of the calibration is performed by simultaneously regulating the spring and the closing member for closing a duct inside the valve for the through-flow of the return fluid; the compression of the spring raises the differential pressure threshold at which the valve reaction starts: in this case, in fact, the reaction force of the spring becomes higher and, consequently, the differential pressure able to overcome this force increases. In order to achieve this compression, however, the relative position of closing member and seat of the said internal duct is altered, with the result that, in order to adjust the reactive force of the spring, the response characteristic of the valve is modified (since there is a variation in the value of Kvs or the flow coefficient when the valve is fully open) such that the valve may become too sensitive or too insensitive to the variations in the differential pressure $\Delta P$.

The technical problem which is posed, therefore, is that of providing a DPCV (Differential Pressure Control Valve) which can be axially mounted on a return line of a hydraulic circuit and which is able to allow adjustment of the setting for compensation of the pressure differential between delivery and return without, however, altering the response characteristics of the said valve.

In connection with this problem it is also required that this device should have small dimensions, be easy and inexpensive to produce and assemble and be able to be easily installed at any user location, even by non-specialized users.

These results are obtained according to the present invention by an axial valve according to the characteristic features of claim 1.

Figure 2:
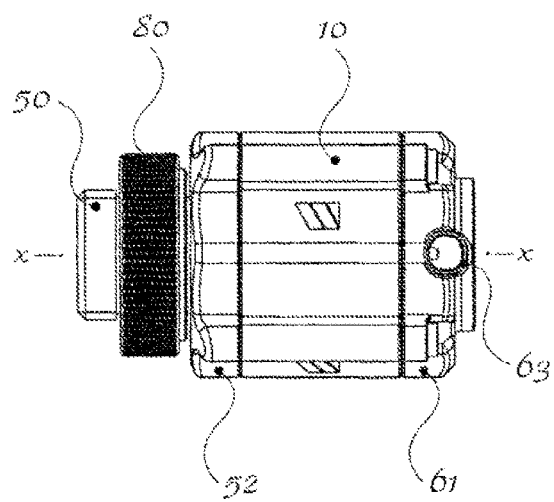
Figure 3:
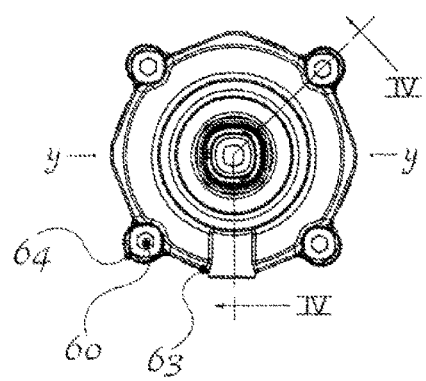
Figure 4:
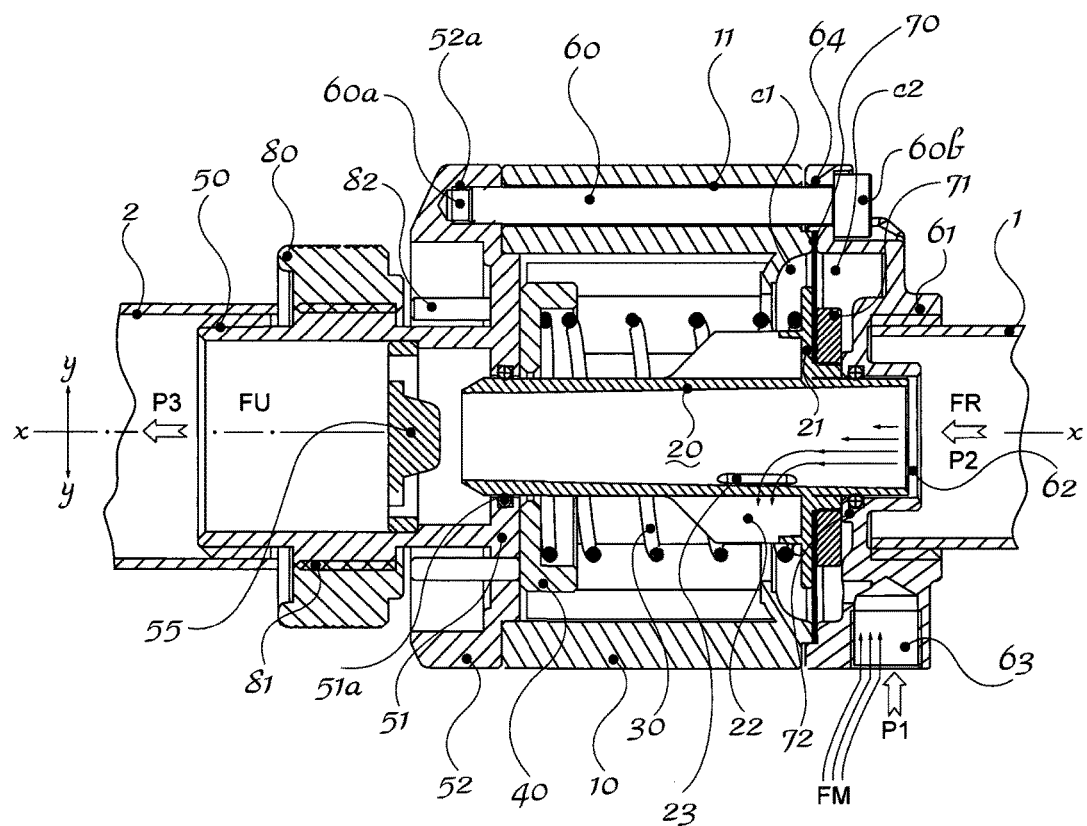
Figure 5:
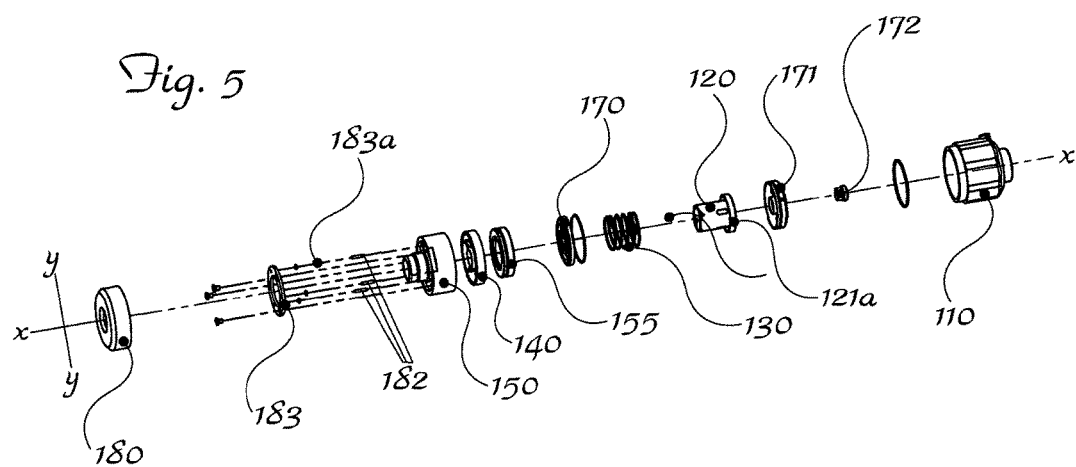
Figure 6:
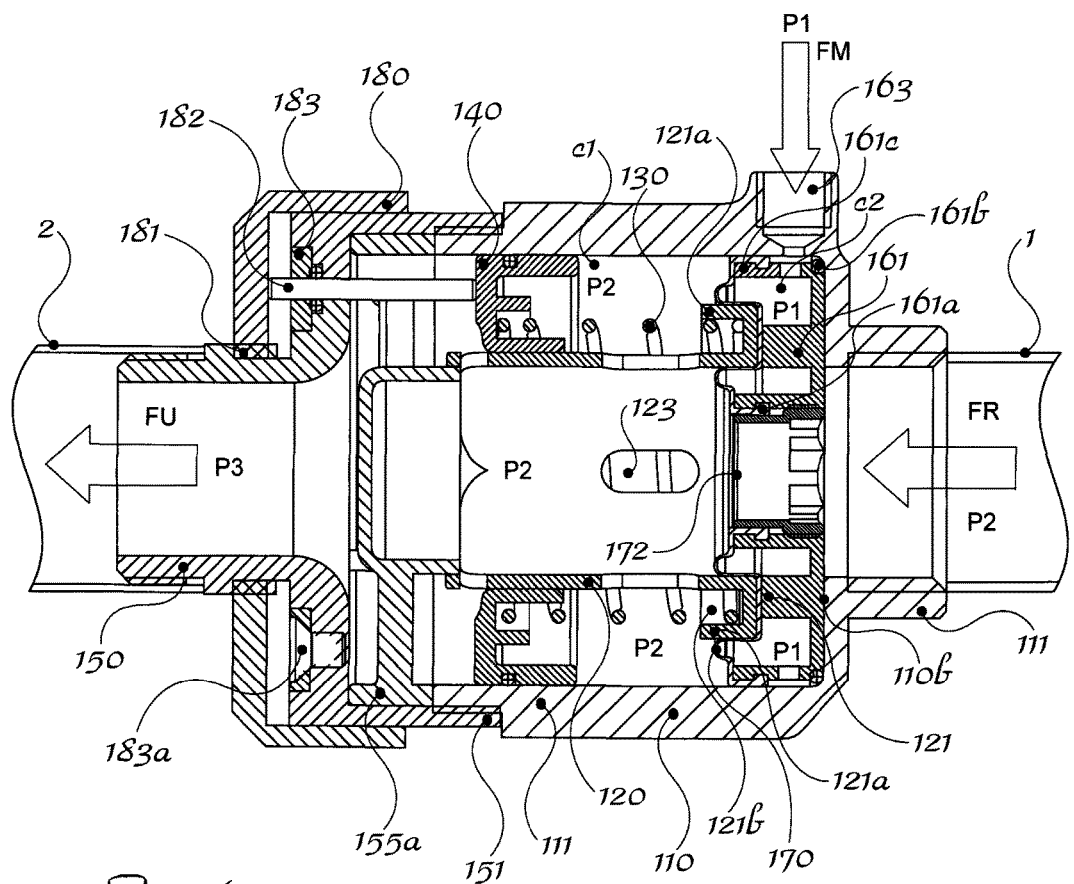
Figure 7:
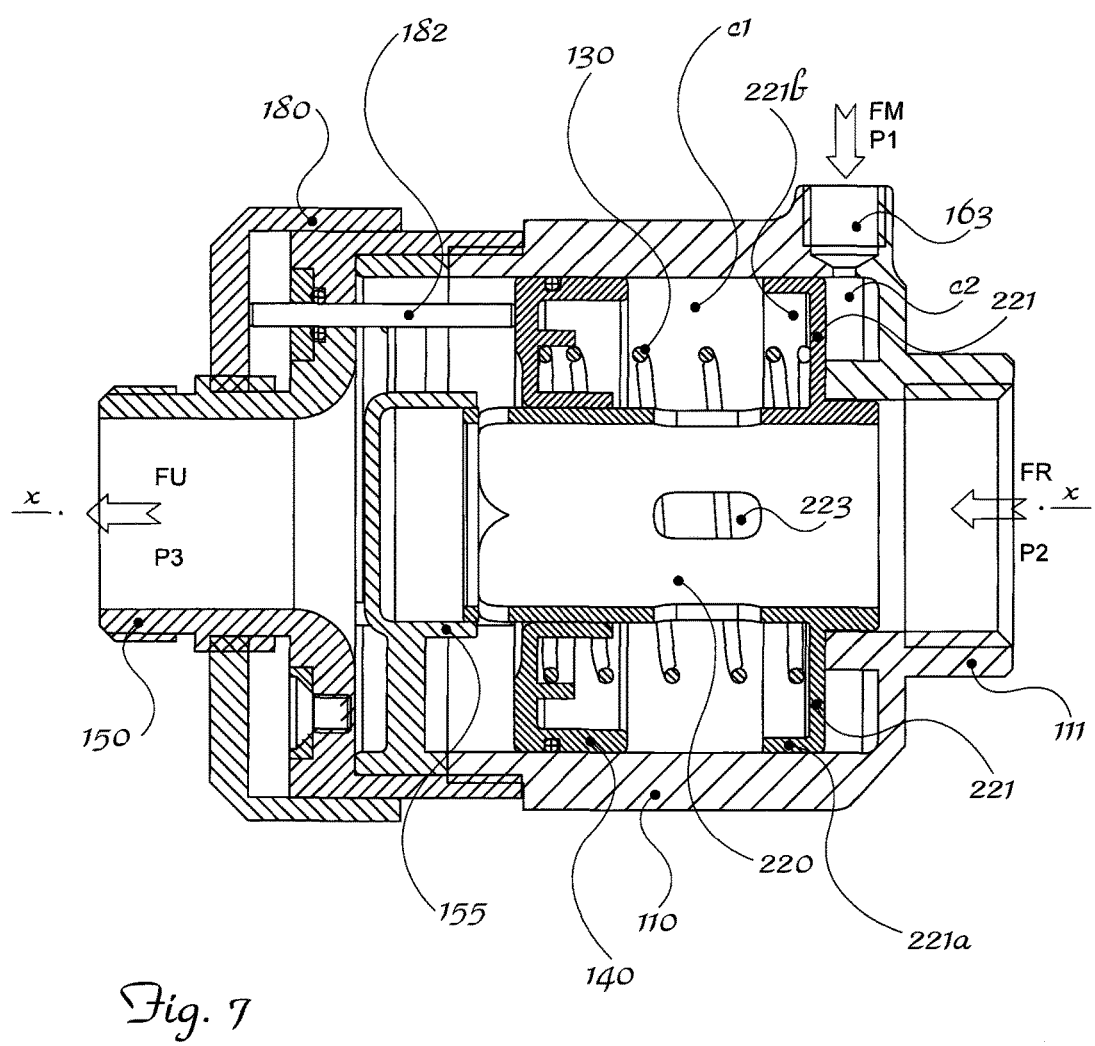

Further details may be obtained from the following description of non-limiting examples of embodiment of the subject of the present invention, provided with reference to the accompanying drawings, in which:

FIG. 1: shows an exploded view of a first example of embodiment of a DPCV according to the present invention;

FIG. 2: shows a side view of the valve according to FIG. 1 in the assembled condition;

FIG. 3: shows a front view, from the return side, of the valve according to FIG. 2;

FIG. 4: shows a cross-section along the plane indicated by IV-IV in FIG. 3;

FIG. 5: shows an exploded view of a second example of embodiment of a valve according to the invention;

FIG. 6: shows a cross-section, similar to that of FIG. 4, of the embodiment of FIG. 5; and FIG. 7: shows a cross-section, similar to that of FIG. 4, of a further variation of embodiment of the valve according to the invention.

As shown in FIG. 1 and assuming solely for the sake of easier description and without a limiting meaning: a pair of reference axes in a respective longitudinal/axial direction X-X, corresponding to the direction of flow of the fluid, and a transverse/radial direction Y-Y, orthogonal thereto; an inlet side FR defined by a return pressure P2 and corresponding to the outlet of a duct 1 for the return fluid FR from the hydraulic circuit; and an outlet side FU, corresponding to the connection of the valve to the return of the hydraulic circuit 2 to which the fluid FU under compensated pressure P3 returns; a first example of a valve according to the invention comprises essentially:

an annular body 10 which has, formed along its outer peripheral edge, longitudinal seats 11 extending longitudinally;

a tubular body 20 which is coaxially inserted inside the annular body 10 and the end of which facing the inlet side FR has a disk 21 from which reinforcing flanges 22 extend, said flanges being tapered towards the opposite end and joined to the said tubular body; slots 23 are formed in the tubular body;

a spring 30 coaxially arranged on the outside of the tubular body and axially kept in position by the disk 21 on the inlet side FR and by an abutment flange 40 on the outlet side FU;

a pipefitting 50 for connection to the hydraulic circuit 2 which supports internally a coaxial and fixed closing member 55 for closing the outlet aperture for allowing the fluid to exit the tubular body 20.

The end of the tubular body 20 facing the outlet is provided with a baffle 51 which in the example is joined to the pipefitting 50 and which is coaxially slidable on the tubular body 20 via a coaxial opening 51*a* and provided with an axially extending annular edge 52 and having a diameter preferably corresponding to the diameter on which the axial seats 11 of the annular body 10 are positioned; said diameter is provided with female-thread seats 52*a* for mating with the thread 60*a* of locking screws 60*b*, the heads 60*b* of which bear against:

a body 61 for closing the valve on the inlet side FR, said body having a coaxial passage 62 for entry of the fluid, a preferably radial opening 63 which can be connected to the hydraulic circuit for the entry of the delivery fluid FM under pressure P1 and axial openings 64 for receiving screws 60 for locking the assembly;

an elastic membrane 70 arranged at right angles to the longitudinal axis X-X between the disk 21 of the tubular body and the closing element 61 and kept in position against the said disk by a membrane pressing element 71 against which the closing body 61 acts; the membrane 70 has a coaxial hole 72 designed to allow the tubular body 20 to pass through;

a locking ring nut 80 which can be screwed onto an external thread 81 of the pipefitting 50 and acts coaxially thereon so as to sealingly close the assembly;

pins 82 are axially arranged between the locking ring nut 80 and the abutment flange 40 of the spring 30 and pass through the baffle 51 of the pipefitting 50 so as to come into contact with the said flange 40.

With this configuration of the assembled valve the following are formed:

a first chamber C1 closed on the inlet side by the elastic membrane 70 and filled, via the slots 23 of the tubular body 20, by the return fluid FR under pressure P2 supplied from the header 1;

a second chamber C2 closed on the outlet side by the same membrane 70 and in the inlet side by the closing body 61 and filled by the delivery fluid FM under pressure P1 supplied via the corresponding radial opening 63;

in this way the membrane 70 is acted on simultaneously by:

the return fluid FR which exerts a pressure P2 towards the inlet side of the valve, the delivery fluid FM which exerts a pressure P1 towards the outlet side, producing between the two sides of the membrane 70 a pressure differential $\Delta P=(P1-P2)$ which corresponds to a force $F=Dp*A$ acting on the membrane 70, wherein A is the area of the surface of the membrane exposed to the two pressures P1 and P2. Said force F is opposed by the force exerted by the spring 30.

With this configuration the operating principle of the valve is as follows:

firstly the force of the spring 30 is set to the predefined prestress value;

the valve is arranged axially at the outlet of the return branch or the return header 1 of the hydraulic circuit 2;

the radial opening 63 is connected to the delivery branch of the hydraulic circuit, resulting in filling of the chamber C2 with the fluid FM under pressure P1;

the chamber C1 is instead filled by the return flow FR under pressure P2;

during normal operation: the membrane remains in an equilibrium state until a disturbance of the hydraulic circuit causes an undesirable increase/decrease of the pressure P1 and therefore of the differential $\Delta P=P1-P2$, resulting in the displacement of the membrane 70 towards the inlet/outlet branch of the valve;

the displacement of the membrane causes the tubular body 20 to be displaced towards the fixed closing member 55, causing a closing/opening of the aperture which allows the fluid to pass through the tubular body 20 and, consequently, an increase/reduction in the pressure P2 (which moves towards or diverges away from the value of P1), tending to keep the value of the differential pressure $\Delta P$—and consequently that of throughput—constant.

FIGS. 5 and 6 show a second embodiment of the valve according to the invention which comprises:

an annular body 110, with an axial extension 111 on the inlet side FR, provided with a thread for connection to the return branch 1 of the hydraulic circuit;

a tubular body 120 which is coaxially inserted inside the tubular body 110 and the end of which facing the inlet side FR has a disk 121 from which an annular edge 121*a* extending axially extends so as to define a seat 121*b*; slots 123 are formed in the tubular body.

a spring 130 coaxially arranged on the outside of the tubular body 120 and axially kept in position by the disk 121, via the seat 121*b*, on the inlet side FR and by an abutment flange 140 on the outlet side FU;

a pipefitting 150 for connection to the return branch 2 of the hydraulic circuit;

a fixed coaxial closing member 155 for closing the fluid outlet aperture in the tubular body 120, arranged between the pipefitting 150 and the annular body 110; the closing member 155 has an annular extension 155*a*;

a torus-shaped body 161 arranged on the inlet side of the valve and provided with a central hole 161*a* for the passage of the fluid supplied from the inlet FR and open on the outlet side FU.

One or more radial holes 161*b* are formed in the outer cylindrical surface 161*c* of the torus-shaped body;

an elastic membrane 170 arranged at right angles to the longitudinal axis X-X between the disk 121 of the tubular body 120 and the torus-shaped body 161 by which it is also radially kept in position; the membrane 170 has a coaxial hole designed to allow the insertion of a bushing 172 for allowing the return fluid FR to pass towards the tubular body 120; the bushing 172 hermetically fixes the membrane inside the surface 161*a* of the torus-shaped body 161;

a locking ring nut 180 which can be screwed onto an external thread 181 of the pipefitting 150 on the outlet side and acting on axial pins 182, which pass through the pipefitting 150 so as to come into contact with the said flange 140; the pins are guided through holes in a plate 183 fixed to the pipefitting 150 by means of screws 183*a*.

As shown, O-ring seals, shown, but not numbered, are arranged between the flange 140 and the annular body 110 and between the latter and membrane-pressing element 170 and around the adjustment pins 182.

With this configuration of the assembled valve the following are formed:

a first chamber C1 closed on the inlet side by the elastic membrane 170 and filled by the return fluid FR under pressure P2 supplied from the return branch/header 1 and passing through the slots 123 in the tubular body 120;

a second chamber C2 closed by the same membrane 170 on the outlet side and by the torus-shaped body 161 on the inlet side and filled by the delivery fluid FM under pressure P1 supplied via the corresponding radial openings 163 in the body 110 and 161*b* of the torus-shaped body;

in this way the membrane 170 is acted on simultaneously by:

the return fluid FR which exerts a pressure P2 towards the inlet side of the valve, the delivery fluid FM which exerts a pressure P1 towards the outlet side, producing at the ends of the membrane 170 a pressure differential ΔP=(P1−P2) which corresponds to a force F=Dp*A acting on the membrane, wherein A is the area of the surface of the membrane exposed to the two pressures P1 and P2. Said force F is opposed by the force exerted by the spring 130.

With both the configurations shown in FIG. 4 and FIG. 6 the operating principle of the valve is as follows:

firstly the force of the spring 30,130 is set to the predefined prestress value;

the valve is arranged axially between the outlet of return header 1 and the return branch of the hydraulic circuit 2;

the radial opening 63,163 is connected to the delivery branch of the hydraulic circuit, resulting in filling of the chamber C2 with the fluid FM under pressure P1; the chamber C1 is in turn filled by the return flow FR under pressure P2;

during normal operation the membrane remains in an equilibrium state until a disturbance of the hydraulic circuit causes an undesirable increase/decrease of the pressure P1 and therefore of the differential ΔP=P1−P2, resulting in displacement of the membrane 70 towards the inlet/outlet branch of the valve;

the displacement of the membrane causes the tubular body 20,120 to be displaced towards the fixed closing member 55,155, causing a closing/opening of the aperture which allows the fluid to pass through the tubular body 20,120 and, consequently, an increase/reduction in the pressure P2 (which moves closer to/further away from the value of P1), tending to keep the value of the differential pressure ΔP—and consequently that of throughput—constant.

If it is required to vary the calibration of the vale, it will be possible to vary the force F which the spring 30,130 exerts on the membrane 70,170, by adjusting the ring nut 80,180 on the pins 82,182 which cause the flange 40,140 retaining the spring 30,130 to be displaced towards the inlet side of the valve, thus increasing the compression of the spring and therefore the prestress force thereof; as can be seen, the displacement of the flange 40,140 leaves the position of the closing member 55,155 unchanged.

As shown in FIG. 7 a further variation of embodiment of the valve according to the invention is envisaged; in this embodiment the tubular body 220 has an end edge facing the inlet side 111 of the valve and joined to a disk 221 which has a slot 223 and is provided with an annular edge 221a extending in the axial direction; the disk 221 extends radially so as to bring said annular edge 221a into contact with the inner surface of the annular body 110 on which it may slide axially in a sealing manner; the seat 221b for the end the spring 230 is thus formed; the axial position of the disk 221 is such as to form the closing element on the outlet side of the chamber C2 for containing the delivery fluid FM under pressure P1 and the closing element on the inlet side of the chamber C1 for containing the return fluid FR under pressure P2, forming basically a piston, the axial movement of which in both directions is once again determined by the combined actions of the spring 130 and the pressure differential ΔP=(P1−P2) in the same way as in the preceding embodiments.

Without changing the operating principle of the valve already described, the configuration shown in FIG. 7 results in a significant simplification of the number of components and the assembly operations.

It is therefore clear how the valve offers an axially extending assembly which is simple and inexpensive to assemble and apply to hydraulic circuits, preferably intended for heating/cooling, or preferably to fluid distribution headers, and how adjustment of the valve calibration (namely setting of the differential pressure value which is to be maintained between the delivery branch and the return branch), which may be achieved via the spring, without involving the closing member, does not alter the adjustment process or the responsiveness of the valve to variations in the pressure differential. Calibration may be performed in situ depending on the characteristics of the hydraulic circuit.

In addition to the above the embodiments of the valves shown in FIGS. 5, 6 and 7 result in a further technical advantage since they are able to reduce substantially the friction and the deterioration which are due to the wear resulting from the necessary seals and which prevent in a variable and unpredictable manner the free movement of the adjustment members.

The configurations shown in FIGS. 6 and 7 include in fact only the O-ring seal which is arranged between the flange 140 and the annular body 110, said elements not being subject to axial movement and therefore not giving rise to wear.

The problem of friction is insignificant in the case of high pressure imbalances ΔP=P1−P2, but may instead become significant in the case where ΔP has a value which is low, but in any case higher than the set threshold value of the valve (in which case the valve should react, albeit only slightly); in this situation it could in fact happen that the force generated on the membrane is unable to overcome the static friction due to the seals, this in fact preventing adjustment of the ΔP.

Although described in connection with a number of embodiments and a number of preferred examples of embodiment of the invention, it is understood that the scope of protection of the present patent is determined solely by the following claims.

The invention claimed is:

1. An axial differential pressure control valve (DPCV) for controlling the differential pressure between branches of a hydraulic circuit, comprising:
   a longitudinal axis parallel to a direction of flow of a fluid,
   an axial inlet for ingress of a return fluid under pressure P2 supplied from a return branch of a hydraulic circuit,
   a radial inlet for ingress of a delivery fluid under pressure P1 supplied from a delivery branch of the hydraulic circuit,
   an axial outlet coupled to the hydraulic circuit for egress of a fluid under a compensated pressure P3,
   an annular body;
   a tubular body coaxially inside the annular body, the tubular body having a first end adjacent the axial inlet and a second end defining an outlet aperture;
   an annular disk on the first end of the tubular body;
   a spring surrounding the tubular body and axially kept in position against the annular disk on a first side and by an abutment flange on a second side;
   a pipefitting for connection to the hydraulic circuit;
   a coaxial closing member for selectively closing the outlet aperture and mounted between the tubular body and the pipefitting;
   a locking ring nut screwed on an external thread of the pipefitting to sealingly close the pipefitting;
   a first chamber in fluid-dynamic communication with the axial inlet for ingress of the return fluid under pressure P2 supplied from the return branch;

a second chamber in fluid-dynamic communication with the radial inlet for ingress of with the delivery fluid under pressure P1;

sealing separation means arranged between said first chamber and said second chamber containing the return fluid and the delivery fluid, respectively, said separation means being movable axially as a result of a thrust due to a pressure differential ΔP=P1−P2, wherein the spring also provides a force on the sealing separation means, wherein:

the closing member is fixed; and pins are axially arranged between the ring nut and the abutment flange and pass through the pipefitting so as to contact the abutment flange, the pins being displaced axially upon rotation the ring nut independently of the fixed closing member, so as to vary compression of the spring.

2. Valve according to claim 1, wherein the tubular body has slots for passage of the return fluid towards the first chamber.

3. Valve according to claim 1, wherein the annular disk of the tubular body has an annular edge extending axially for containing the first side of the spring.

4. Valve according to claim 1, wherein the sealing separation means is a membrane provided with a central hole for insertion of a bushing for through-flow of the return fluid and arranged at a right angle to the longitudinal axis between the annular disk of the tubular body and retaining means.

5. Valve according to claim 1, wherein the sealing separation means has an annular edge extending in an axial direction from the annular disk joined to the tubular body, the annular disk radially extending so as to bring said annular edge into contact with an internal surface of the annular body.

6. An axial differential pressure control valve (DPCV) for controlling the differential pressure between branches of a hydraulic circuit, the DPCV comprising:

an axial inlet for receiving a return fluid at a first pressure, the return fluid being supplied from a return branch of the hydraulic circuit;

a radial inlet for receiving a delivery fluid at a second pressure, the delivery fluid being supplied from a delivery branch of the hydraulic circuit;

an axial outlet connected to the hydraulic circuit for egress of a fluid at a third compensated pressure;

an annular body;

a tubular body coaxially inside the annular body, the tubular body having a first end for receiving the return fluid via the axial input, the first end also has an annular disk;

an abutment flange adjacent a second end of the tubular body;

a spring coaxially arranged outside of the tubular body and axially kept in position by extending between the annular disk and the abutment flange;

a pipefitting for connection to the hydraulic circuit;

a coaxial closing member for closing an outlet aperture formed in the second end of the tubular member, the outlet aperture for egress of the fluid from the tubular body, the coaxial closing member being fixed between the tubular body and the pipefitting;

a locking ring nut screwed on an external thread of the pipefitting to sealingly close the pipefitting;

a first chamber in fluid-dynamic communication with the axial inlet;

a second chamber in fluid-dynamic communication with the radial inlet; and sealing separation means arranged between said first chamber and said second chamber, said separation means being movable axially upon activation of a combination thrust resulting from a pressure differential ΔP=P1−P2 and a force from the spring.

7. A DPCV as recited in claim 6, further comprising pins axially arranged between the ring nut and the abutment flange.

8. A DPCV as recited in claim 7, wherein the pins pass through the pipefitting to contact the abutment flange and the pins are displaced axially upon axial movement of the ring nut independently of the fixed closing member, so as to vary compression of the spring.

9. An axial differential pressure control valve (DPCV) for controlling the differential pressure between a return branch and a delivery branch of a hydraulic circuit, the DPCV comprising:

a closing body defining: an axial inlet for ingress of return fluid supplied from the return branch at a return pressure; a radial inlet for ingress of delivery fluid supplied from the delivery branch at a delivery pressure; and defining an outer chamber designed to be filled with the delivery fluid at the delivery pressure;

a first pipefitting defining an axial outlet for egress of exit fluid into the hydraulic circuit at a third compensated pressure;

an annular body coupled to the first pipefitting and defining an inner chamber in fluid communication with the inlet for receiving the return fluid;

a tubular body having an inlet end that forms an annular disk and an opposing outlet end, the tubular body being coaxially mounted inside the annular body so that the inlet end faces the axial inlet for ingress of the return fluid;

an abutment flange surrounding the tubular body and housed inside the annular body opposing the annular disk;

a spring coaxially arranged around the tubular body and extending between the annular disk and the abutment flange for applying a first force against the annular disk;

a valve seat that selectively mates with the outlet end of the tubular body for closing fluid flow thru the tubular body;

a membrane between the return chamber and the delivery chamber, the membrane moving axially based upon a thrust due to a pressure differential between the return pressure and the delivery pressure;

a ring nut moveably coupled to the first pipefitting; and pins axially arranged between the ring nut and the abutment flange, wherein the pins contact with the abutment flange and are selectively moved axially upon axial movement of the ring nut independently of the fixed closing member so as to vary compression of the spring and, in turn, vary force against the annular disk to counteract the thrust.

10. A DPCV as recited in claim 9, wherein the ring nut is threaded onto the axial outlet of the first pipefitting for sealingly coupling the axial outlet to the hydraulic circuit.

11. A DPCV as recited in claim 9, wherein the closing member is fixed in a stationary manner in the axial outlet.

* * * * *